United States Patent
Demirakos et al.

(10) Patent No.: US 9,220,371 B1
(45) Date of Patent: Dec. 29, 2015

(54) FRYER BASKET DIVIDER

(76) Inventors: Louis Demirakos, Merrick, NY (US);
Beatrice Demirakos, Merrick, NY (US)

( * ) Notice: Subject to any disclaimer, the term of this patent is extended or adjusted under 35 U.S.C. 154(b) by 337 days.

(21) Appl. No.: 12/723,484

(22) Filed: Mar. 12, 2010

(51) Int. Cl.
*A47J 37/12* (2006.01)

(52) U.S. Cl.
CPC ................................. *A47J 37/1295* (2013.01)

(58) Field of Classification Search
CPC .............................. A47J 37/1295; A47J 37/12
USPC .................... 99/416, 418, 448, 450; 220/543; D7/667, 47, 356, 409; 426/438
See application file for complete search history.

(56) References Cited

U.S. PATENT DOCUMENTS

| | | | |
|---|---|---|---|
| 2,524,900 A | 10/1950 | Einhorn | |
| 2,658,444 A | 11/1953 | Wheeler | |
| 2,740,349 A * | 4/1956 | De Gonia | A47J 37/1295 99/403 |
| 3,282,460 A * | 11/1966 | Boznango | A47J 37/1295 206/513 |
| 3,484,252 A * | 12/1969 | Popeil | A23L 1/217 426/438 |
| 3,985,071 A | 10/1976 | Pottinger et al. | |
| 4,006,675 A * | 2/1977 | Lill | A47J 37/1295 211/126.9 |
| 4,232,596 A * | 11/1980 | Kroll | A47J 37/1295 211/10 |
| 4,502,374 A * | 3/1985 | Davis | A47J 37/1295 426/509 |
| 4,508,027 A | 4/1985 | McCord | |
| 4,542,684 A | 9/1985 | Cantrell | |
| 4,854,227 A | 8/1989 | Koopman | |
| 4,980,187 A * | 12/1990 | Johnson | A23L 1/0107 426/438 |
| 5,079,020 A * | 1/1992 | Koopman | A23L 1/0107 426/438 |
| 5,740,720 A | 4/1998 | Marsh | |
| 6,176,175 B1 | 1/2001 | Moreth | |
| D469,297 S * | 1/2003 | Bouhuys | D7/330 |
| 7,383,963 B2 | 6/2008 | Svabek et al. | |
| D584,917 S * | 1/2009 | Mullen | D7/390 |
| 7,500,427 B2 | 3/2009 | Rosenzweig | |
| D689,344 S * | 9/2013 | Cloutier | D7/686 |
| 2014/0060340 A1* | 3/2014 | Matos | A47J 37/1295 99/416 |

FOREIGN PATENT DOCUMENTS

GB 1.522.400 8/1978
WO WO2008/066780 6/2008

* cited by examiner

*Primary Examiner* — Steven Leff
(74) *Attorney, Agent, or Firm* — Michael I. Kroll (57) ABSTRACT

A method of deep-frying food in a fryer basket having multiple segregated compartments. The fryer basket divider has a generally planar wire mesh sized to reside within the fryer basket to form multiple compartments in the fryer basket, with a handle extending from the top. The handle has oppositely disposed distal ends extending generally perpendicularly from the side of the mesh and which are retractable by squeezing the handle.

12 Claims, 8 Drawing Sheets

FRYER BASKET DIVIDER

BACKGROUND OF THE INVENTION

1. Field of the Invention

The present invention relates generally to dividers and, more specifically, to fryer basket dividers. The present invention, a fryer basket divider, is specially designed to lend versatility to a fryer basket while speeding up food production. The fryer basket divider is constructed of a durable stainless steel housing composing of a squeezable handle, allowing the user to easily insert and remove the divider when necessary. The divider locks into place upon release of the handle. The user can create as many compartments as needed, enabling the user to separately fry a plurality of food items simultaneously by altering the size of the fry basket. When the handle of the divider is squeezed, it can be placed within a fryer basket or removed. By releasing the squeeze on the handle, locks the divider in place. The divider is easy to use, takes up little storage space, and is easily cleaned. The innovative divider can be used in restaurants, food establishments, and fast food restaurants.

2. Description of the Prior Art

There are other net-like baskets designed for deep frying. Typical of these is U.S. Pat. No. 2,524,900 issued to Einhorn on Oct. 10, 1950.

Another patent was issued to Wheeler on Nov. 10, 1953 as U.S. Pat. No. 2,658,444. Yet another U.S. Pat. No. 3,985,071 was issued to Pottinger et al. on Oct. 12, 1976 and still yet another was issued on Apr. 2, 1985 to McCord as U.S. Pat. No. 4,508,027.

Another patent was issued to Cantrell on Sep. 24, 1985 as U.S. Pat. No. 4,542,684. Yet another U.S. Pat. No. 4,854,227 was issued to Koopman on Aug. 8, 1989. Another was issued to Marsh on Apr. 21, 1998 as U.S. Pat. No. 5,740,720 and still yet another was issued on Jan. 23, 2001 to Moreth as U.S. Pat. No. 6,176,175.

Another patent was issued to Svabek et al. on Jun. 10, 2008 as U.S. Pat. No. 7,383,963. Yet another U.S. Pat. No. 7,500,427 was issued to Rosenzweig on Mar. 10, 2009. Another was issued to McDonald's Corp on Aug. 23, 1978 as U.K. Patent No. GB1522400 and still yet another was issued on Jun. 5, 2008 to Forte as U.S. Patent No. WO2008/066780.

U.S. Pat. No. 2,524,900

Inventor: George Einhorn

Issued: Oct. 10, 1950

A collapsible container comprising a pair of side walls, each of said side walls being defined by a rectangular wire frame, a pair of inwardly foldable end walls, each of said end walls having a central vertical rod and an upper and lower rod integral therewith to define a section of said end wall, said upper and lower rods each having terminal loops at their free ends engaged rotatably around an end of one of said rectangular wire frames, each of said end walls having an additional pair of upper and lower rods to define a second section thereof, terminal loops at each end of said upper and lower rods of said second section, one pair of said loops being rotatably engaged around said central vertical rod of said first-mentioned section, the other pair of said loops being rotatably engaged around a respective end of the other of said rectangular wire frames, and a rigid bottom swingable upwardly from a horizontal operative position to a collapsed position in abutment against one of said side walls.

U.S. Pat. No. 2,658,444

Inventor: William O. Wheeler

Issued: Nov. 10, 1953

A structure for supporting food to be cooked in an immersed position in a cooking medium comprising a relatively shallow food supporting tray having top and bottom rectangular frames, a foraminous bottom connected to said bottom frame and foraminous walls secured to the sides and ends of said top and bottom frames, a wall extension unit of foraminous material conforming in outline to that of said tray, one end wall of said unit having rigidly secured inturned hooks engageable beneath said top frame, a carrying handle extending laterally from adjacent the top of the other end wall of said unit, and hook means associated with said handle and with said other end wall of said unit swingable in and out of engagement with the adjacent end of the top frame of said tray, said means being pivotally connected to said other end of said unit and being operable from said handle.

U.S. Pat. No. 3,985,071

Inventor: Eugene A. Pottinger et al.

Issued: Oct. 12, 1976

A clamshell type of basket for use in deep fat cooking of comestibles and provided with features especially adapted to commercial fast-service cooking is disclosed.

U.S. Pat. No. 4,508,027

Inventor: Frederick B. McCord

Issued: Apr. 2, 1985

A frying basket large enough to contain two or three individual servings of a food product is equipped with a pair of removable partitions including basket divider portions and right angular basket cover portions. When in place on the frying basket, two or three individual servings can be cooked simultaneously in the basket without intermixing, and when completely cooked, the individual servings can be dispensed one at a time from the basket while the remaining servings are retained in the basket for further cooking and subsequent dispensing. One or two of the removable partitions can be utilized with a standard size frying basket. The arrangement avoids the necessity for reweighing or recounting individual servings after cooking and avoids delivering unequal servings to customers.

U.S. Pat. No. 4,542,684

Inventor: David D. Cantrell

Issued: Sep. 24, 1985

The specification discloses a system for frying food items including a fry basket and an insert which functions to maintain the food items in the fry basket in a separated condition. The insert is dimensioned to fit at least partially within the fry basket and is removably disposed therein. The insert includes two longitudinal support members, a plurality of elongate transverse support members extending between the longitudinal support members and a plurality of separators extending from the transverse support members. The insert may be used in at least two positions, a downwardly facing position or an upwardly facing position and it may be used with or without clips to secure it to the basket.

U.S. Pat. No. 4,854,227

Inventor: R. Nelson Koopman

Issued: Aug. 8, 1989

An apparatus especially suitable for cooking, in a cooking fluid, food products which lose a portion of their moisture content as vapor during the cooking cycle is provided. The apparatus is configured to allow food products to be spaced and oriented in the apparatus so that during cooking water vapor is expelled from the food products into the vertical convection channels formed by the spacing and orienting of the food products. The expelled buoyant water vapor augments the upward vertical convection of the cooking fluid through the vertical convection channels, thereby improving heat transfer from the cooking fluid to the food products. As a result, cooking time and fat uptake is reduced and a more uniform product quality is provided.

U.S. Pat. No. 5,740,720

Inventor: David L. Marsh

Issued: Apr. 21, 1998

A new Multiple-Doughnut Fryer System for deep frying a plurality of doughnuts simultaneously and uniformly within one convenient deep fryer. The inventive device includes a housing having a top opening, a fry tank within the housing, three wire mesh baskets removably positioned within the fry tank, and an elongated heating element near the fry tank for heating cooking oil within the fry tank. The wire mesh baskets include a vertical member secured near a looped handle, wherein an aperture and a slot project into the vertical member for removably catching upon a support pin secured to the fry tank for supporting the wire mesh basket within the fry tank.

U.S. Pat. No. 6,176,175

Inventor: R. Edward Moreth

Issued: Jan. 23, 2001

A fry basket and liner apparatus for immersion in cooking oil in a fryer includes a fry basket formed of wire basket mesh for retaining items to be cooked; a basket liner fit within the basket and including liner mesh having a grid finer than the basket mesh for retaining particles of fried matter separated from the food items, while the basket is immersed in the cooking oil within the fryer; so that the particles do not collect on interior surfaces of the fryer. The fry basket preferably additionally includes a hinged mesh lid forming a basket lid; and a wire handle having a trigger mechanism including structure for opening the lid. The fry basket preferably additionally includes a lid biasing spring connected to the lid in such a manner as to close the basket lid automatically. The basket lid preferably includes a lid hinge and an overlapping lid end protruding beyond the basket rim and the lid hinge; and the basket lid opening trigger mechanism preferably includes a lever abutting or hingedly connected to the overlapping lid end; a lever fulcrum secured to a fulcrum point along the length of the handle creating a lever ratio swinging the basket lid open upon gripping and squeezing the handle and lever together to pivot the lever toward the handle.

U.S. Pat. No. 7,383,963

Inventor: Lawrence J. Svabek

Issued: Jun. 10, 2008

A rigid wire frame is formed around the exterior of a wire mesh fry basket. The rigid wire frame is shaped as an inverted frusto-pyramid. The inverted frusto-pyramid allows the baskets to be stacked together. A rigid wire hook, opposite a rigid wire handle enables the basket to be hung from an edge. The rigid wire frame protects the wire mesh fry basket from damage.

U.S. Pat. No. 7,500,427

Inventor: Mark Rosenzweig

Issued: Mar. 10, 2009

A basket assembly for use with a deep fryer having a lower foraminous basket and an upper foraminous insert which quickly and easily attaches to the lower basket at a predetermined location intermediate the top and bottom of the lower basket to thereby hold the food in place beneath the surface of a hot cooking liquid such as oil. Advantages of the assembly are that it forces foods down to increase the efficiency of flash frying, it provides the ability to cook more than one item at a time while keeping them separated, and it provides a food product which cooks faster because it is unnecessary to turn food which floats to the top, thereby resulting in less fat absorption.

U.K. Patent Number GB 1522400

Inventor: McDonald's Corporation

Published: Aug. 23, 1978

An open frame frying basket comprises a bottom 12; a back 14; ends 16; an open front for loading; at least one food shelf comprising spaced ledges 20 supported by a wire framework, which is the basket bottom in the case of the only or lowermost shelf; a respective, pivotal food retaining member 22 which is held in a food retaining position parallel to the bottom shelf 19 by a latch 28. The latch can be pivoted to allow the member 22 to be pivoted about an axis provided by the back 14 so permitting the food to be removed. Upon returning the latch, the member 22 can be supported in its raised position on upper latch bar 34. In practice the retaining member forms another food shelf which itself is associated with an upper retaining member or basket top 24. Vertical divider plates 26 help compartmentalize and retain the food pieces.

International Patent Application Publication No. WO 2008/066780

Inventor: Melissa Forte

Published: Jun. 5, 2008

The apparatus includes a basket body, a basket door with a pivoting mechanism for attaching the door to a bottom portion of the basket body and a basket slider connected to the basket door. The basket door is pivotal between an open position and a closed position. The apparatus also includes a handle with a handle housing and comprising a trigger member in the handle housing. The trigger member has a pivot end in the slot in the opposite end. The apparatus also has a basket drive rod with a first end and a second end. The first end connects to the basket slider and the second end slidably engages the slot of the trigger member. In operation, pivoting of the trigger member about the trigger pivot and translates the basket drive rod with a translation moving the basket slider. The basket slider moves the basket door between an opened and a closed position.

While these frying baskets may be suitable for the purposes for which they were designed, they would not be as suitable for the purposes of the present invention, as hereinafter described.

SUMMARY OF THE PRESENT INVENTION

A primary object of the present invention is to provide a fryer basket divider.

Another object of the present invention is to provide a fryer basket divider consisting of a squeezable handle that allows the user to insert or remove the divider when necessary.

Yet another object of the present invention is to provide a fryer basket divider consisting of a squeezable handle that locks in place upon release of the handle.

Still yet another object of the present invention is to provide a fryer basket divider that the user can create as many compartments as required.

Another object of the present invention is to provide a fryer basket divider that is constructed of durable stainless steel.

Yet another object of the present invention is to provide a fryer basket divider that requires little room to store.

Additional objects of the present invention will appear as the description proceeds.

The present invention overcomes the shortcomings of the prior art by providing a fryer basket divider consisting of a squeezable handle that allows the user to insert or remove the divider when necessary. A fryer basket divider consisting of a squeezable handle that locks in place upon release of the handle. Also providing a fryer basket divider that the user can create as many compartments as required. Also a divider that is constructed of durable stainless steel and requires little room to store.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Fryer Basket Divider of the present invention. With regard to the reference numerals used, the following numbering is used throughout the various drawing figures.

10 Fryer Basket Divider
12 fryer basket
14 handle of 10
16 user
18 segregated compartments in 12
20 food
22 wire mesh
24 bottom edge
26 top edge
28 side edges
30 perimeter wire
32 central bend on 14
34 matching bends on 14
36 handle portion of 14
38 distal ends of 14
40 downward extensions on 10
42 handle locking bar on 10
44 stainless steel

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
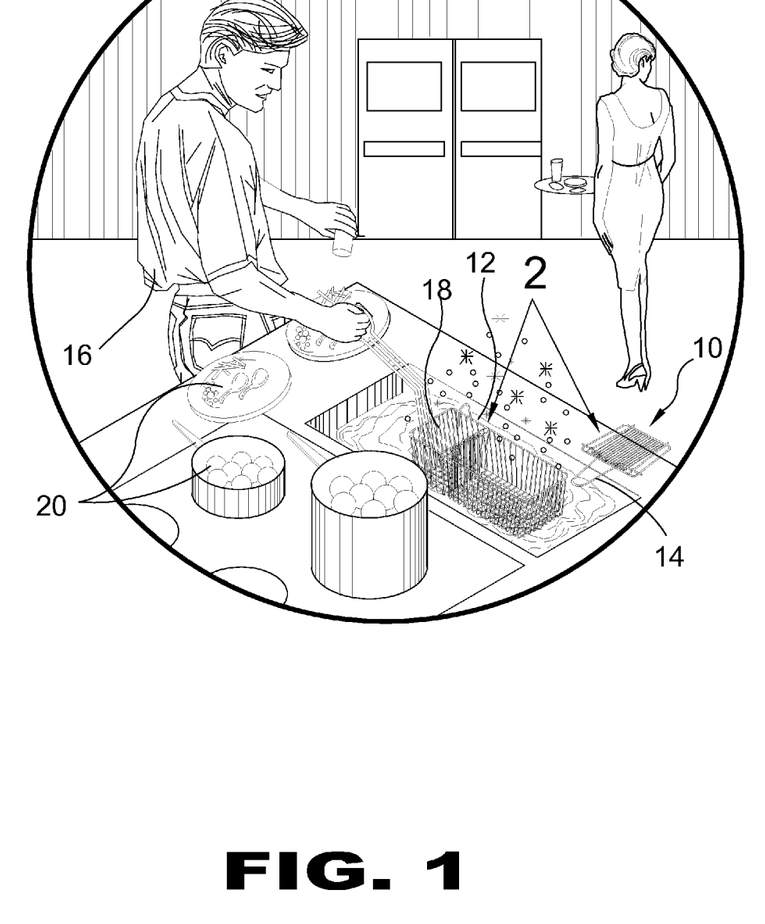
FIG. 1 is an illustrative view of the present invention in use.

FIG. 1 is an illustrative view of the present invention in use. The fryer basket divider 10 of the present invention is designed to lend versatility to a fryer basket 12 while speeding up the food production line. The fryer basket divider 10 is constructed out of durable stainless steel and has a squeezable handle 14 allowing the user 16 to easily insert and remove the divider 10 when necessary. The divider 10 locks into place upon release of the handle 14. The user 16 may create as many segregated compartments 18 as needed, enabling the user 16 to separately fry two, three or more types of food 20 simultaneously and/or keeping food items portioned controlled within the fryer basket when needed.

Figure 2:
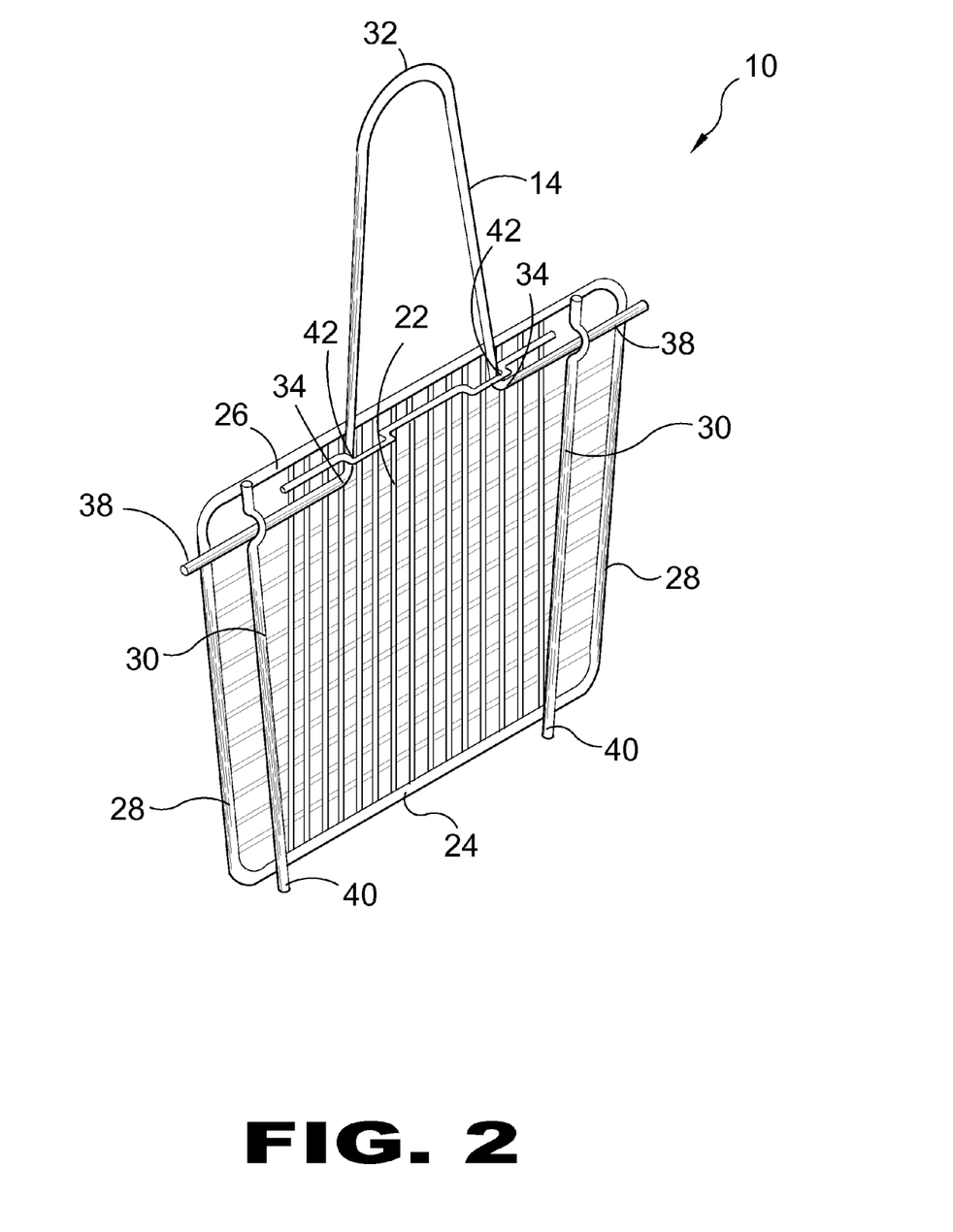
FIG. 2 is perspective view of the present invention.

FIG. 2 is a perspective view of the present invention. The fryer basket divider 10 of the present invention is constructed out of durable stainless steel and has a squeezable handle 14 allowing the user to easily insert and remove the divider 10 when necessary. The divider 10 locks into place upon release of the handle 14. The user may create as many compartments as needed, enabling the user to separately fry two, three or more items simultaneously. The fryer basket divider 10 has a generally planar wire mesh 22 sized to reside within the fryer basket to form a plurality of segregated compartments. The mesh 22 has a bottom edge 24, a top edge 26, and two oppositely disposed side edges 28 circumscribed by a perimeter wire 30, and a handle 14 extending from the top edge 26, the handle 14 comprising a wire having a central bend 32 and matching bends 34 on opposite sides of said handle bend 32 such that the handle 14 has a central handle portion 36 extending perpendicularly from the top edge 26 and oppositely disposed distal ends 38 extending generally perpendicularly from the side edges 28, the distal ends 38 retractable within the side edges 28 by compressing the handle 14. Also shown in FIG. 2 are a pair of wire extensions 40 extending generally perpendicularly down from the bottom edge 24, and a handle locking bar 42 restricting movement of the handle 14 between a first position which prevents handle compression and a second position allowing handle compression.

Figure 3:
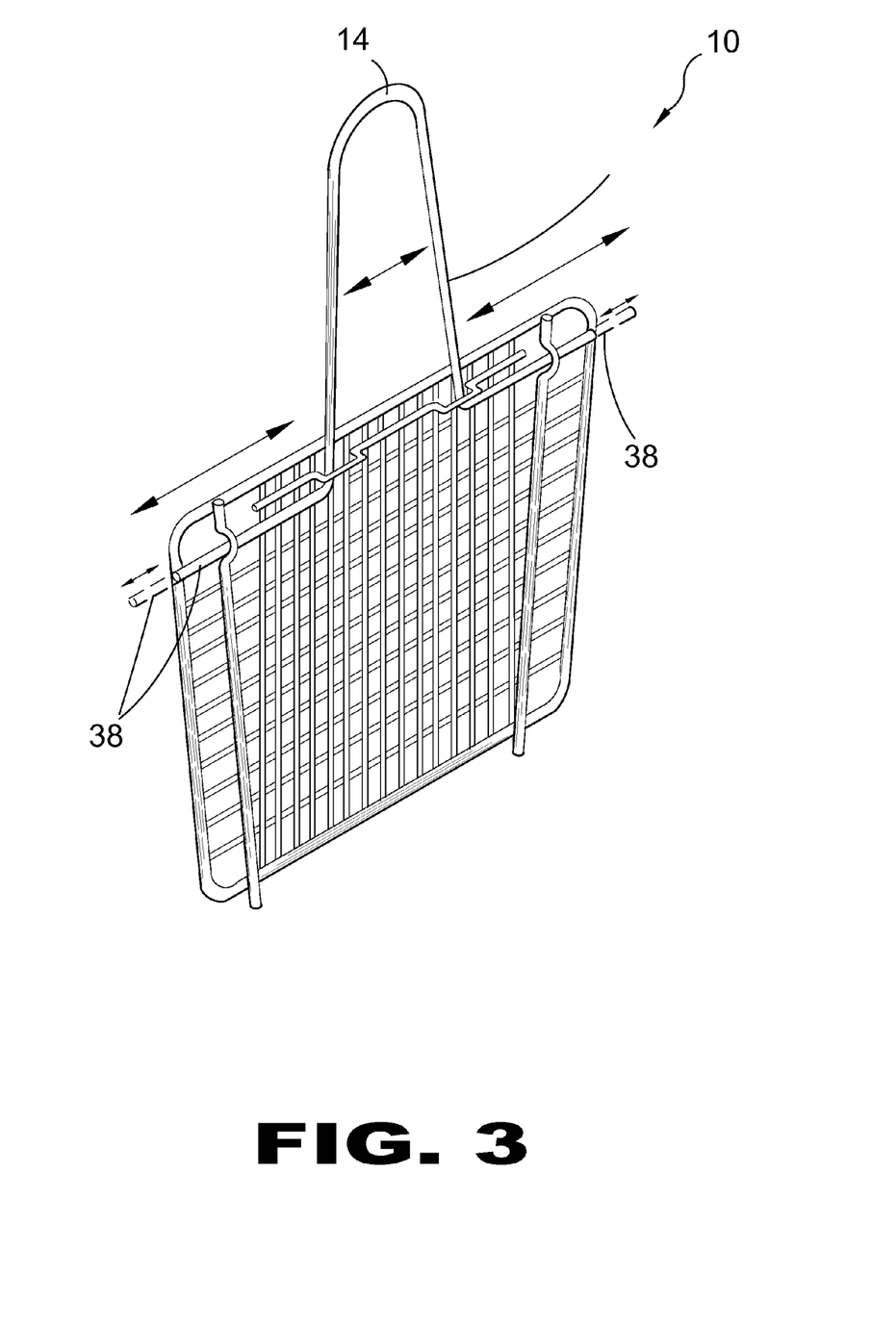
FIG. 3 is a perspective view of the present invention shown in the compressed position.

FIG. 3 is a perspective view of the present invention shown in the compressed position. The fryer basket divider 10 of the present invention is constructed out of durable stainless steel and has a squeezable handle 14 allowing the user to easily insert and remove the divider when necessary. The divider 10 locks into place upon release of the handle 14 due to the displacement of the distal ends 38 thereof. The user may create as many compartments as needed, enabling the user to separately fry two, three or more items simultaneously. The divider 10 actually alters the size of the fry basket.

Figure 4:
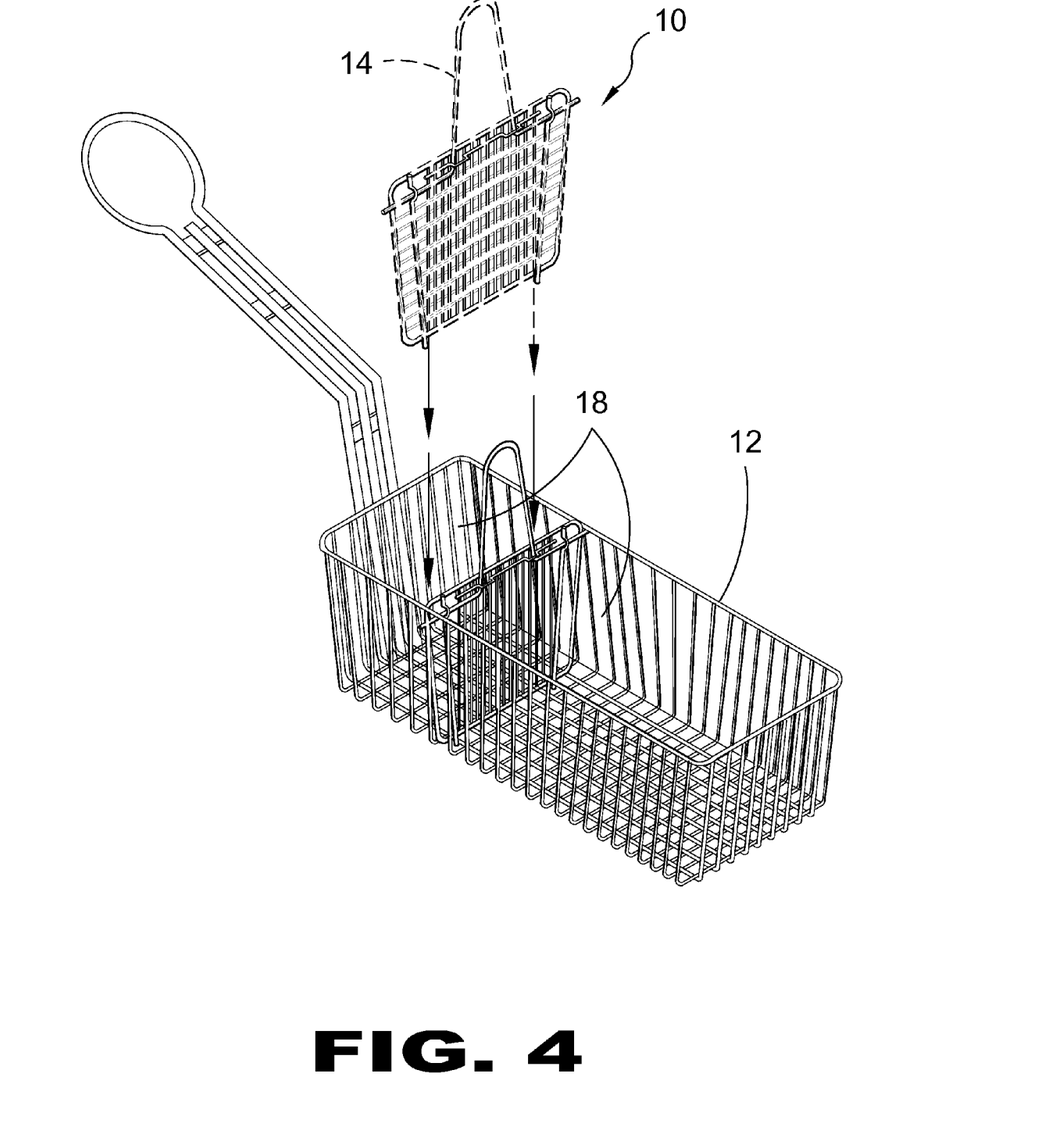
FIG. 4 is a perspective view of the present invention shown within a fryer basket.

FIG. 4 is a perspective view of the present invention shown within a fryer basket 12. The fryer basket divider 10 of the present invention has a squeezable handle 14 allowing the user to easily insert and remove the divider when necessary. The divider 10 locks into place upon release of the handle 14. The user may create as many segregated compartments 18 as needed, enabling the user to separately fry two, three or more items simultaneously.

Figure 5:
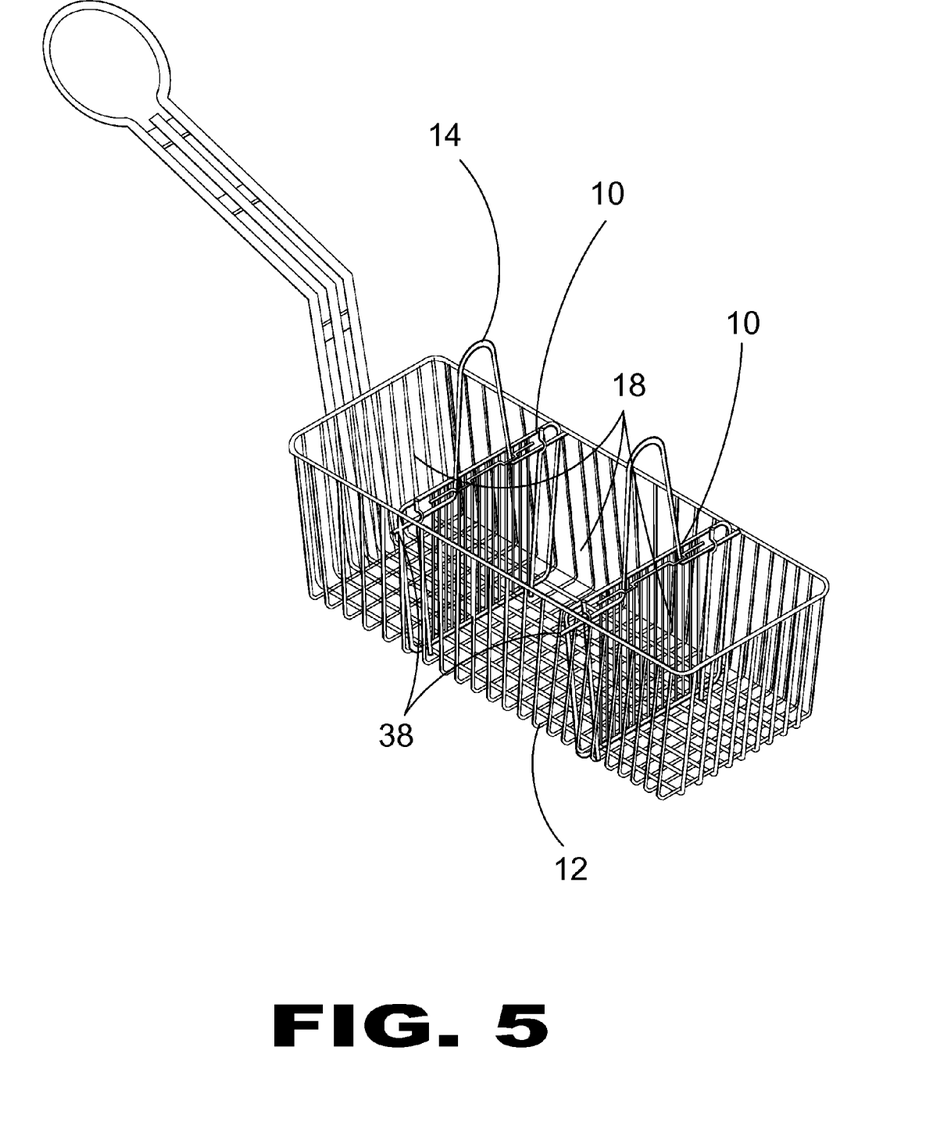
FIG. 5 is a perspective view of the present invention shown with several dividers within a fryer basket.

FIG. 5 is a perspective view of the present invention shown with several dividers 10 within a fryer basket 12. The fryer basket divider 10 has a squeezable handle 14 allowing the user to easily insert and remove the divider 10 when necessary. The divider 10 locks into place upon release of the handle 14 thereby expanding the distal ends 38 thereof. The user may create as many segregated compartments 18 as needed, enabling the user to separately fry two, three or more items simultaneously.

Figure 6:
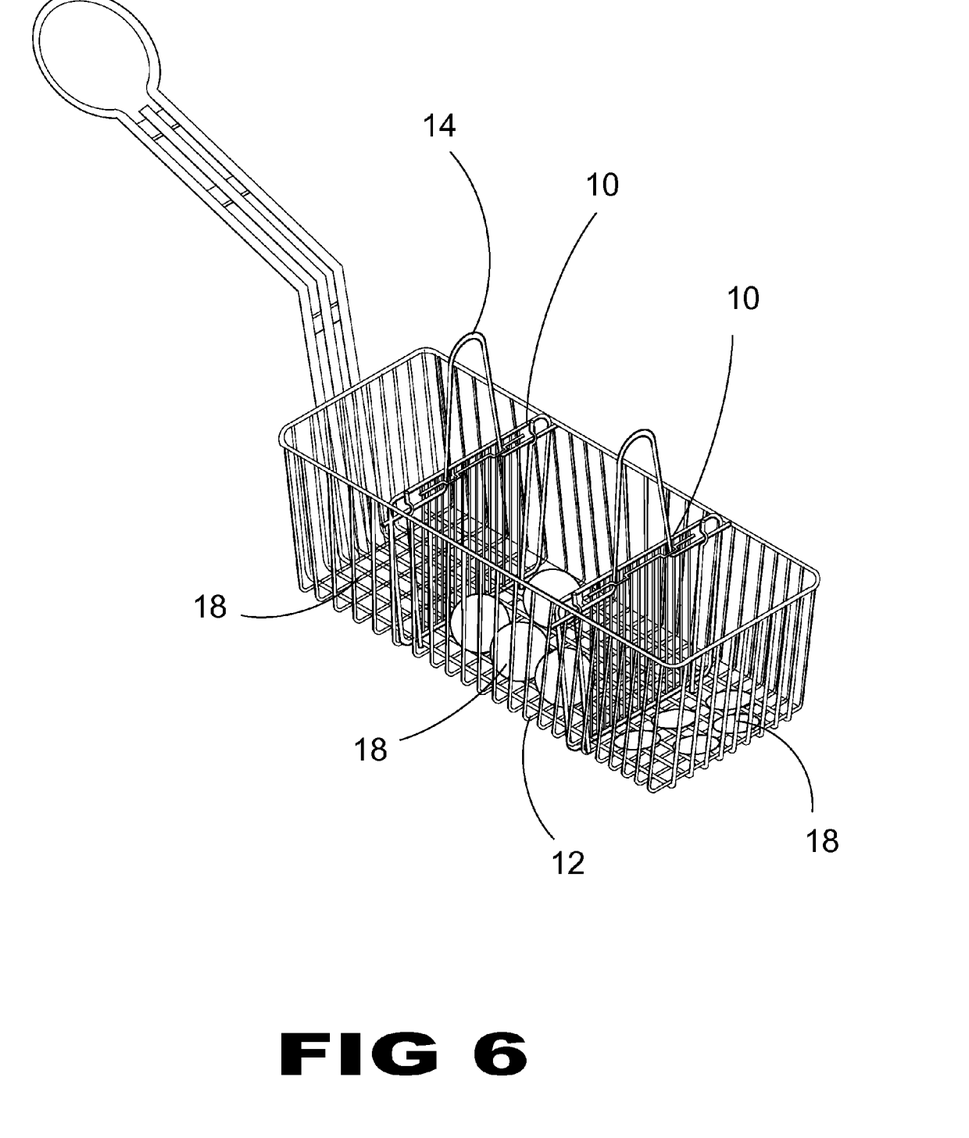
FIG. 6 is a perspective view of the present invention shown with several dividers and food within a fryer basket.

FIG. 6 is a perspective view of the present invention shown with several dividers 10 within a fryer basket 12. The fryer basket divider 10 has a squeezable handle 14 allowing the user to easily insert and remove the divider 10 when necessary. The divider 10 locks into place upon release of the handle 14 thereby expanding the distal ends thereof. The user may create as many segregated compartments 18 as needed, enabling the user to separately fry two, three or more items simultaneously.

Figure 7:
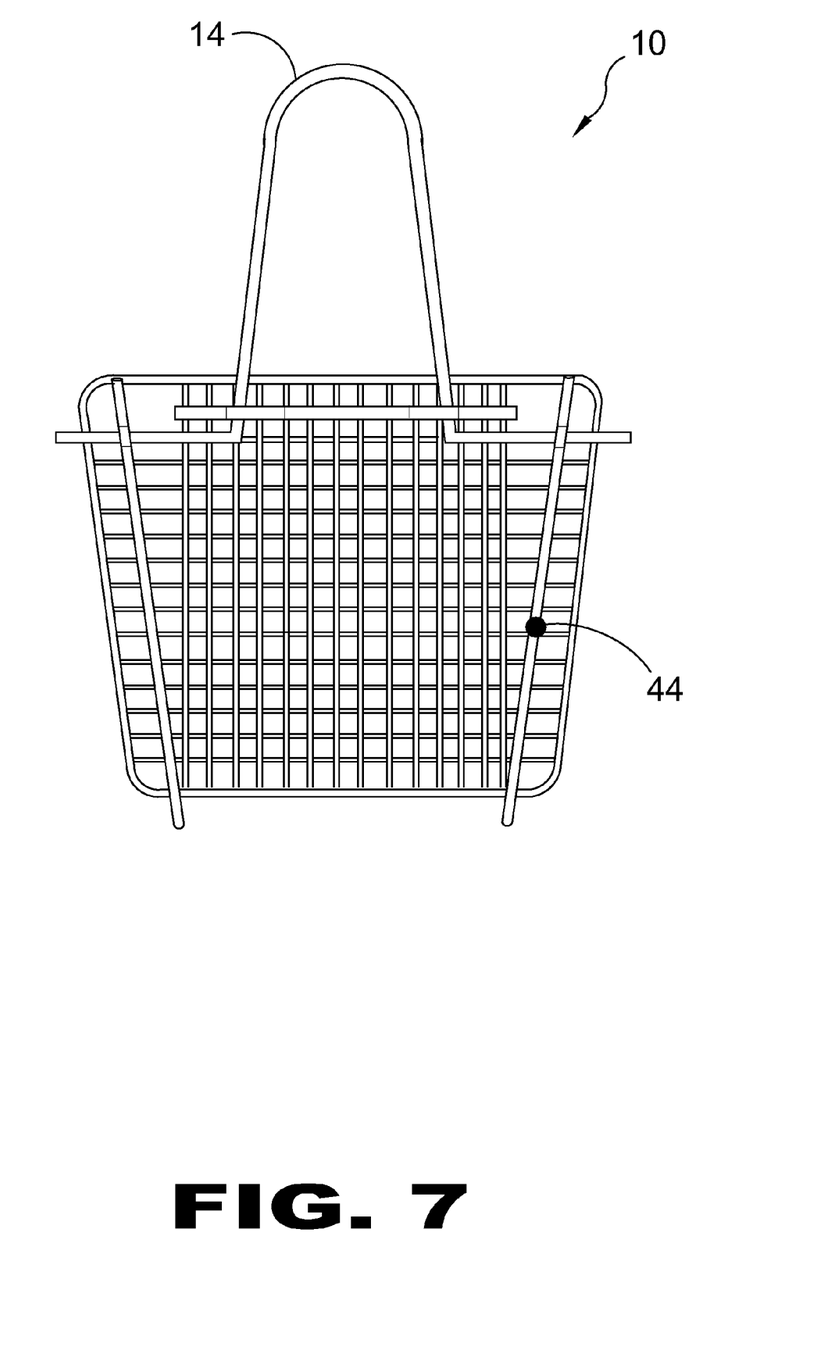
FIG. 7 is a frontal view of the present invention.

FIG. 7 is a frontal view of the present invention. The fryer basket divider 10 of the present invention is designed to lend versatility to a fryer basket while speeding up the food production line. The fryer basket divider 10 is constructed out of durable stainless steel 44 and has a squeezable handle 14 allowing the user to easily insert and remove the divider when necessary. The divider 10 locks into place upon release of the handle 14. The user may create as many compartments as needed, enabling the user to separately fry two, three or more items simultaneously. The divider 10 actually alters the size of the fry basket.

Figure 8:
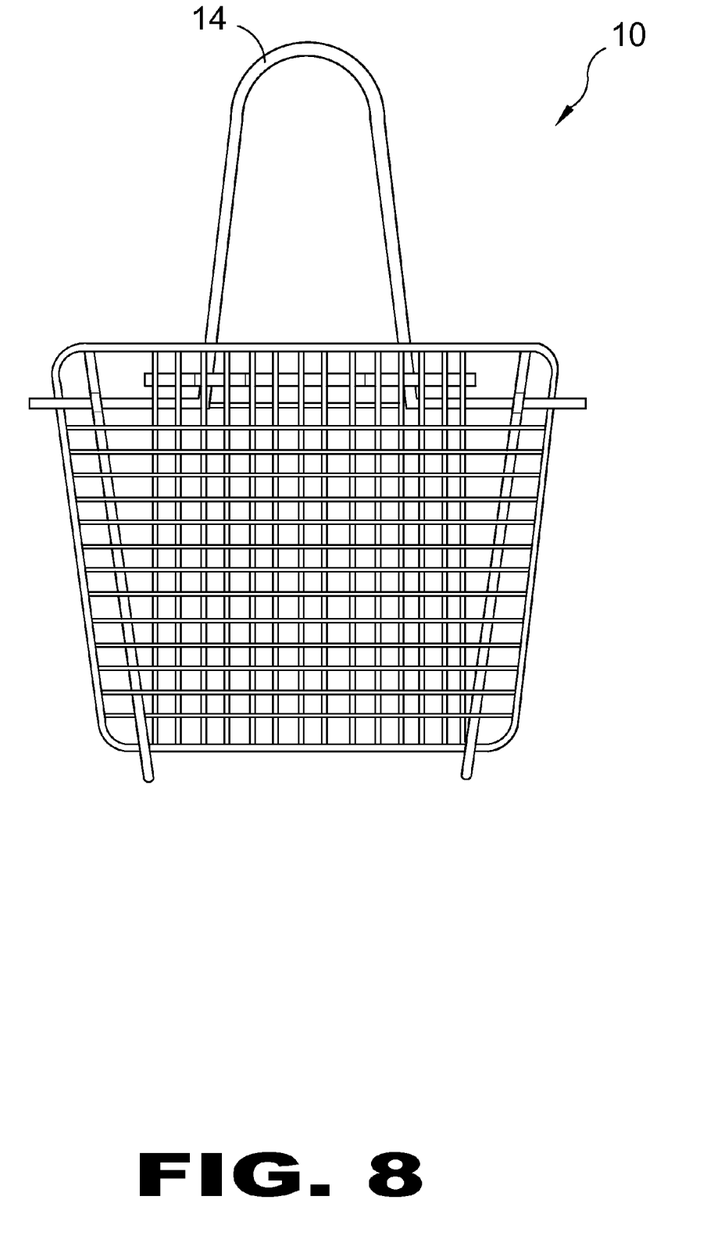
FIG. 8 is a rear view of the present invention.

FIG. 8 is a rear view of the present invention. The fryer basket divider 10 of the present invention is designed to lend versatility to a fryer basket while speeding up the food production line. The fryer basket divider 10 is constructed out of durable stainless steel 44 and has a squeezable handle 14 allowing the user to easily insert and remove the divider when necessary. The divider 10 locks into place upon release of the handle 14. The user may create as many compartments as needed, enabling the user to separately fry two, three or more items simultaneously. The divider 10 actually alters the size of the fry basket.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A fryer basket divider comprising:
    a) a generally planar wire mesh sized to reside within a fryer basket, said mesh having a bottom edge, a top edge, and two oppositely disposed side edges circumscribed by a perimeter wire; and
    b) a handle extending from said top edge, said handle comprising a wire having a central bend and matching bends on opposite sides of said handle bend such that said handle has a central handle portion extending perpendicularly from said top edge and oppositely disposed distal ends extending generally perpendicularly from said side edges, said distal ends retractable within said side edges by compressing the handle.

2. The fryer basket divider according to claim 1, further comprising a plurality of wire extensions extending generally perpendicularly from said bottom edge.

3. The fryer basket divider according to claim 2, comprising a pair of wire extensions extending generally perpendicularly from said bottom edge.

4. The fryer basket divider according to claim 2, further comprising a handle locking bar restricting movement of said handle between a first position which prevents handle compression and a second position allowing handle compression.

5. The fryer basket divider according to claim 1, further comprising a handle locking bar restricting movement of said handle between a first position which prevents handle compression and a second position allowing handle compression.

6. A multiple compartment fryer basket system comprising:
   a) a wire mesh housing forming a fryer basket; and
   b) a fryer basket divider having a generally planar wire mesh sized to reside within said fryer basket forming a plurality of segregated compartments, said mesh having a bottom edge, a top edge, and two oppositely disposed side edges circumscribed by a perimeter wire, and a handle extending from said top edge, said handle comprising a wire having a central bend and matching bends on opposite sides of said handle bend such that said handle has a central handle portion extending perpendicularly from said top edge and oppositely disposed distal ends extending generally perpendicularly from said side edges, said distal ends retractable within said side edges by compressing said handle.

7. The multiple compartment fryer basket system according to claim 6, further comprising a plurality of wire extensions extending generally perpendicularly from said bottom edge.

8. The multiple compartment fryer basket system divider according to claim 7, comprising a pair of wire extensions extending generally perpendicularly from said bottom edge.

9. The multiple compartment fryer basket system divider according to claim 6, comprising plurality of said fryer basket dividers.

10. The multiple compartment fryer basket system divider according to claim 6, further comprising a handle locking bar restricting movement of said handle between a first position which prevents handle compression and a second position allowing handle compression.

11. The multiple compartment fryer basket system divider according to claim 7, further comprising a handle locking bar restricting movement of said handle between a first position which prevents handle compression and a second position allowing handle compression.

12. The multiple compartment flyer basket system divider according to claim 11, comprising plurality of said fryer basket dividers.

* * * * *